United States Patent
Shim

[19]

[11] Patent Number: 6,151,320
[45] Date of Patent: Nov. 21, 2000

[54] APPARATUS AND METHOD FOR IDENTIFYING BOUNDARY OF ASYNCHRONOUS TRANSFER MODE CELL

[75] Inventor: Kee Pyong Shim, Kyonggi-do, Rep. of Korea

[73] Assignee: Hyundai Electronics Ind. Co., Ltd., Kyoungki, Rep. of Korea

[21] Appl. No.: 08/933,909

[22] Filed: Sep. 23, 1997

[30] Foreign Application Priority Data

Nov. 30, 1996 [KR] Rep. of Korea ......................... 96-60253

[51] Int. Cl.[7] .................................................. H04L 12/66
[52] U.S. Cl. .............................................. 370/395; 370/389
[58] Field of Search ................................... 370/252, 389, 370/395

[56] References Cited

U.S. PATENT DOCUMENTS

| 5,710,756 | 1/1998 | Pasternak et al. | 370/216 |
| 5,742,765 | 4/1998 | Wong et al. | 395/200.6 |
| 6,021,163 | 2/2000 | Hoshi | 375/272 |

*Primary Examiner*—Huy D. Vu
*Assistant Examiner*—Dung Trinh
*Attorney, Agent, or Firm*—Reed Smith Shaw & McClay LLP

[57] ABSTRACT

An ATM cell boundary identification apparatus and method. The apparatus comprises an idle cell inserting unit for inserting an idle cell into a cell transmitted from an ATM layer to be matched therewith in its speed; a header error cell generating unit for generating a header error cell by means of header information of the cell transmitted from the idle cell inserting unit; a cell scrambling unit for scrambling payload of the cell received from the header error cell generating unit; a transmission framer for converting the cell obtained in the cell scrambling unit to be suitable to a frame E1; a line interfacing unit for transmitting a transmission frame obtained in the transmission framer to a transmission line after converting it into a bipolar transmission signal, and for transmitting the cell received from the transmission line to a reception framer; a reception framer for identifying a boundary of the cell according to each time slot of the cell transmitted from the line interfacing unit to thereby extract a header error cell; and a header error cell detecting unit for detecting the header error cell extracted from the reception framer, and checking whether the extracted cell is effective or not.

2 Claims, 3 Drawing Sheets

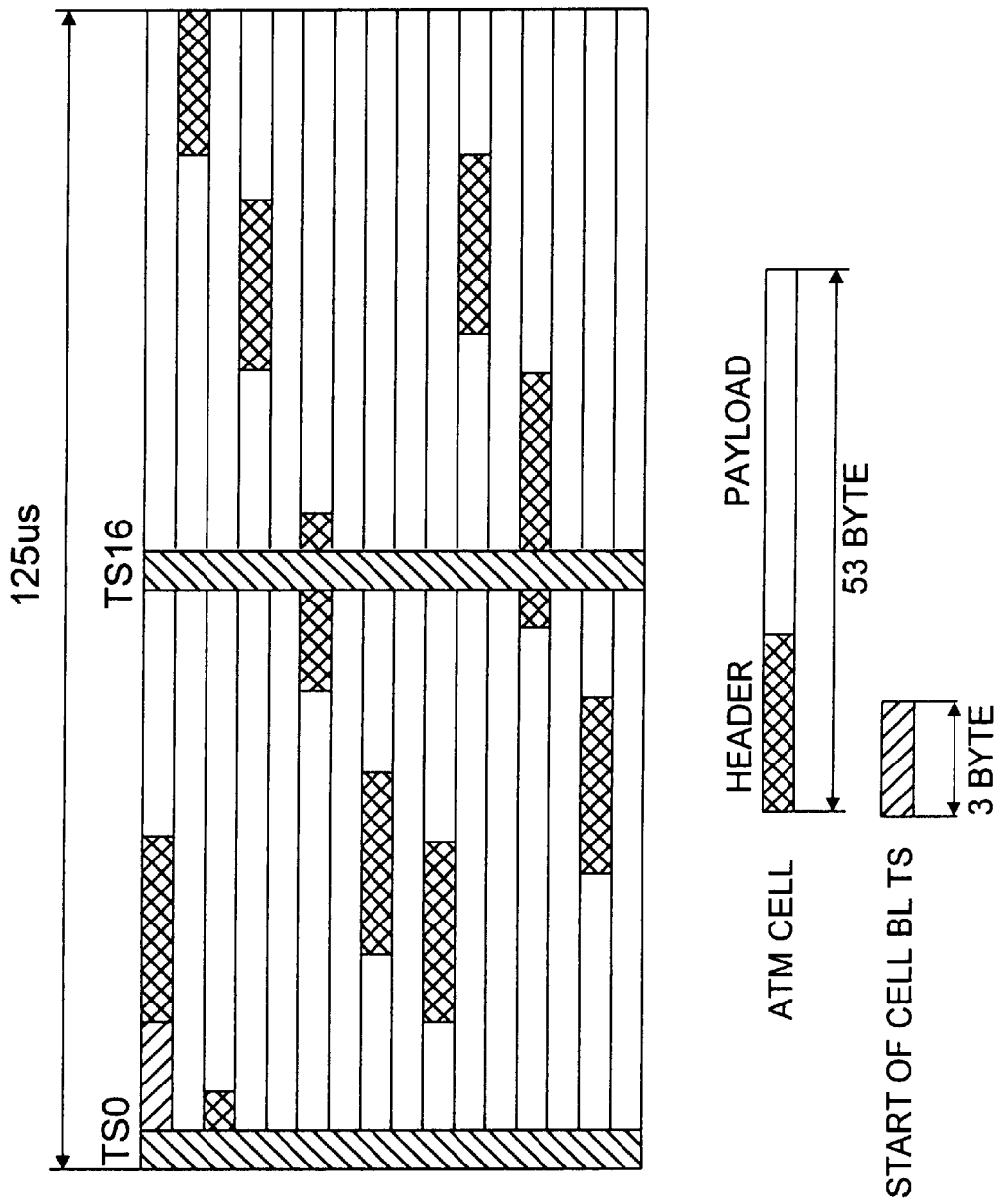
F I G. 2

APPARATUS AND METHOD FOR IDENTIFYING BOUNDARY OF ASYNCHRONOUS TRANSFER MODE CELL

BACKGROUND OF THE INVENTION

1. Field of the Invention

The present invention relates to an asynchronous transfer mode (hereinafter, referred to as ATM) cell boundary identification apparatus and method, which facilitates extraction of the ATM cell from a reception terminal, and prevents an error generation by serially mapping the ATM cell on each time slot of a frame E1 for the period of one multi-frame.

2. Discussion of Related Art

In general, the ATM is to add a destination information to a packet header by dividing a user information into a constant size of packet, and is then to restore the information transferred as a fixed size of cell to an original information.

The ATM cell should consist of a header field of 5 byte and information field of 48 byte. A connection of the cell is discriminated by a virtual path identifier VPI and a virtual channel identifier VCI within a cell header.

In the meantime, in case that the ATM cells are mapped on a framer DS1E and then transferred, a transmission terminal is to generate and insert a cell for header error control HEC with respect to the cell received from a ATM layer, and then is to transmit the ATM cell to the framer DS1E after adjusting the speed of a physical layer with that of the ATM layer through an insertion of an idle cell thereinto.

That is, the speed of the cell received from the ATM layer does not always coincide with information capacity of a transmission path. Thus, in order to fill up a gap between the cells received from the ATM layer, the idle cell is generated in a TC which has functions of generating and canceling a transmission frame, and of mapping the ATM cell on a payload of the transmission frame. The idle cell is then inserted into the gap. The idle cell should have a specific cell header value. According to the cell header value the idle cell is identified and is then disused.

Further, in case that a transfer bit error is of the ATM cell header during the cell transmission, there may happen a cell loss and a cell insertion error to influence on the service quality. So, in order to reduce a cell header error generation probability, a header error control HEC information is included in the last 1 byte of the cell header of 5 byte, the header error control information being used for correcting the error of the header and detecting a plurality of bit errors. Even though the HEC has a cycle redundancy check CRC, the TC corrects the error of the header by operating the CRC.

A value of the HEC is obtained by regarding a bit row of the original header of 32 bit as a polynomial A(X) (where, the coefficient of the highest ranked term is the first bit). Here, a remainder R(x) is given by dividing a value $A(X)X^8$ multiplied by $X^8$ by a CRC generation polynomial $P(x)=X^2+X+1$. However, a bit pattern of the real HEC is given as a form obtained by adding a polynomial $C(x=x^6+x^4+x^2+1$ (01010101) to the remainder R(x) in order to enhance the capacity of the cell synchronization of the bit row (this indicates that the cell synchronization streams by the bit). Through the above step, the ATM cell can be mapped on the frame E1 to achieve the cell transmission. If a cell stream is extracted from the payload DS1E in the reception terminal, the boundary of the ATM cell is identified from the call received from the framer DS1E. And, only an effect cell from which the idle cell and the header error control HEC cell are eliminated, is then transferred to the ATM layer.

That is, in the reception terminal is to identify a front position (cell boundary) of each cell from the cell stream received by setting the cell synchronization through a "magnetic synchronization" using a header error control field (1 octet).

With reference to the attached drawings, the operations will be in detail explained as follows.

In case that the synchronization is intended to be set from a synchronization secession state, i.e., a hunting state, the received bit is temporarily regarded as a front bit of the cell, and the HEC is then calculated. Thereafter, the result of the calculation is compared with the fifth byte. Through the such operations, the front bit is shifted by 1 bit and the HEC is repeatedly calculated to obtain an exact result of the operation. Thereby, once the exact result of the operation is obtained, there can be judged that the cell synchronization is at a state being the same as the synchronization state. And, the HEC should be calculated every 53 byte from that. Thereafter, if the value of HEC is exactly obtained in the M-th, it is regarded as a fact that the cell synchronization is obtained and its state is changed to a synchronization establishment state. Under the synchronization establishment state, if an error arises in the HEC, the state is changed to the hunting state by regarding the synchronization as being secluded through the N-th consecutive error generation.

A reason that there is a delay in judgement between in the synchronization establishment state and the synchronization secession state, is to guarantee a stable operation. The delay when judging the synchronization establishment state from the hunting state is called "backward protection" and the delay when judging the synchronization secession state from the synchronization establishment state is called "forward protection".

The TC has a function of helping the cell to be synchronous. Especially, a magnetic synchronous scrambler of the TC of the transmission and reception terminals performs the function, and it also uses a polynomial $X^{43}+1$ in the payload of the cell.

Therefore, even though any one pattern like the header is temporarily included in the payload, it is impossible for the reception terminal to establish a wrong synchronization by misunderstanding it as the header.

In the meantime, the magnetic synchronous scrambler converts the original information by adding the original information previous to 43 bit, in case of using the above polynomial $X^{43}+1$.

However, as mentioned above, in the method for transmitting/receiving the cell of a conventional physical layer, there arise problems in that it is difficult to extract the cell and a time required in extracting the cell becomes long, since the cell extraction is performed through a complicated algorism like the cell synchronization establishment during the extraction of the cell.

SUMMARY OF THE INVENTION

It is therefore, an object of the present invention to provide an ATM cell boundary identification apparatus and method for easily extracting an ATM cell in a reception terminal by serially mapping the ATM cell on each time slot of a frame E1 for the period of one multi-frame.

It is another object of the present invention to provide an ATM cell boundary identification apparatus and method for preventing an error from being generated during the ATM cell extraction in the reception terminal by serially mapping the ATM cell on each time slot of the frame E1 for the period of one multi-frame.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve this advantage in accordance with the purpose of the present invention, as embodied and broadly described, the ATM cell boundary identification apparatus comprises: an idle cell inserting unit for inserting an idle cell into a cell transmitted from an ATM layer to be matched therewith in its speed; a header error cell generating unit for generating a header error cell by means of header information of the cell transmitted from the idle cell inserting unit; a cell scrambling unit for scrambling payload of the cell received from the header error cell generating unit; a transmission framer for converting the cell obtained in the cell scrambling unit to be suitable to a frame E1; a line interfacing unit for transmitting a transmission frame obtained in the transmission framer to a transmission line after converting it into a bipolar transmission signal, and for transmitting the cell received from the transmission line to a reception framer; a reception framer for identifying a boundary of the cell according to each time slot of the cell transmitted from the line interfacing unit to thereby extract a header error cell; and a header error cell detecting unit for detecting the header error cell extracted from the reception framer, and checking whether the extracted cell is effective or not.

Further, to achieve this advantage in accordance with the purpose of the present invention, as embodied and broadly described, the ATM cell boundary identification method comprises the steps of: transmitting a cell to a frame E1 by mapping overhead information on a first time slot, mapping information to indicate a state of the cell on the next time slot, mapping a first cell on a time slot behind another time slot where the cell start information is written, and mapping a plurality of cells on one multi-frame; and receiving the cell by searching a frame synchronization signal from the multi-frame, checking data of a time slot, sensing a start of the ATM cell, and recognizing a time slot after sensing the start point as a first header of the ATM cell.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

FIG. 2 is a structure diagram of a frame E1 for transmitting a general ATM cell according to the present invention.

DETAILED DESCRIPTION OF PREFERRED EMBODIMENT

Figure 1:
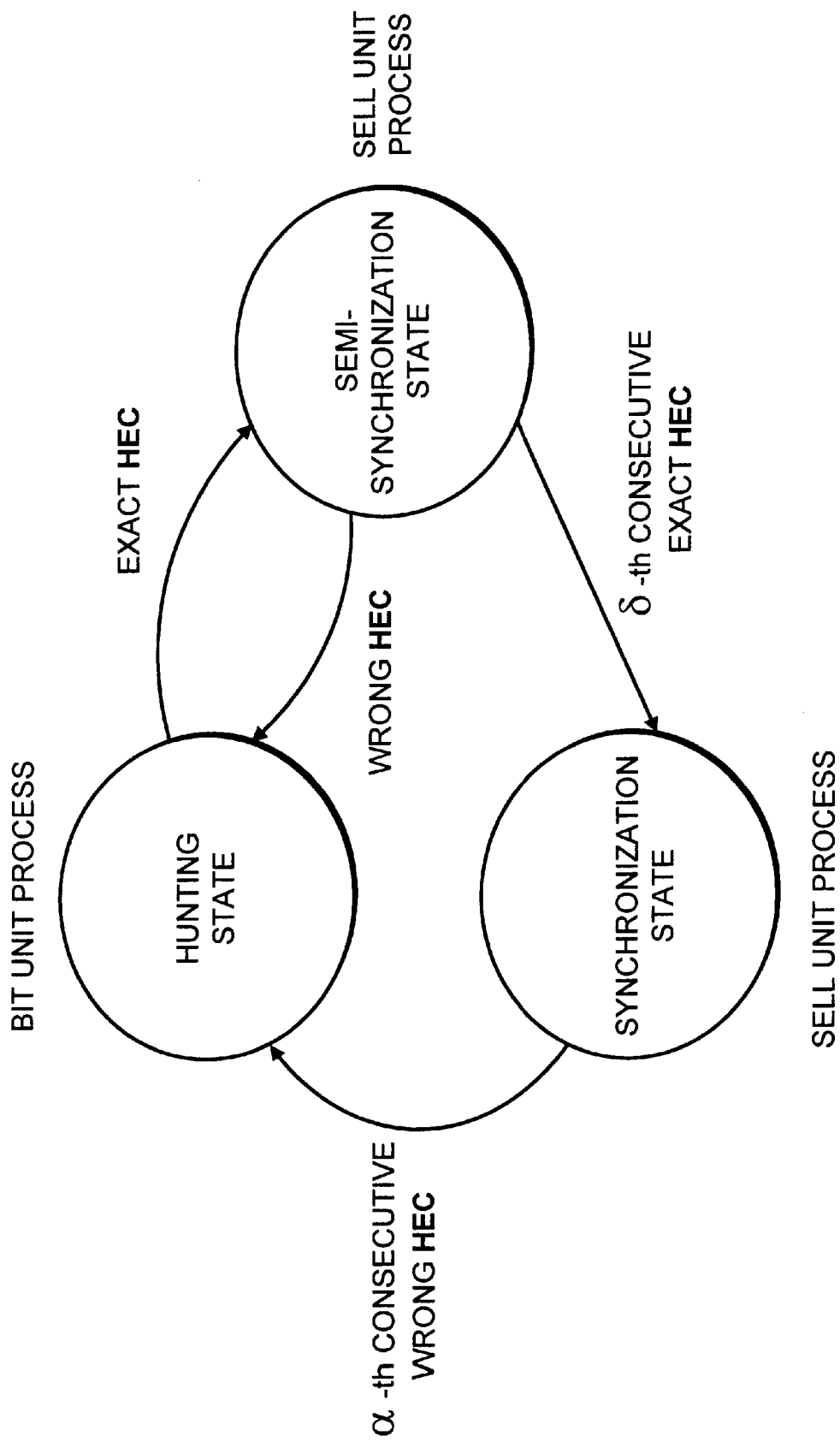
FIG. 1 is a diagram illustrating a cell synchronization probability state in an ATM cell reception terminal according to the prior art.

Reference will now be made in detail to the preferred embodiments of the present invention, examples of which are illustrated in the accompanying drawings.

FIG. 2 is a structure diagram of a transfer frame E1 (2.048 Mbps) for transmitting a general ATM cell according to the present invention. That is, in the frame E1 according to ITU-T G.704, one frame is 256 bit, and a consecutive 16 frames are regarded as one multi-frame. Each frame consists of 32 time slots and each time slot is 8 bit. A time slot number 0 is used as a frame overhead and a time slot number 16 is assigned to transmit a signal.

In case of transmitting the ATM cell by using the frame E1, a function of an ATM physical layer of a transmission terminal is to insert an idle cell so as to be matched with the speed from the ATM layer. And, the function is to scramble a cell payload through a step of generating a header error cell, and then is to serially transmit the scrambled cell payload to an information field of the frame E1.

Further, FIG. 2 shows that the ATM cell is mapped on the information field of the frame E1. That is, the first cell is mapped on a time slot TS number 4 of the frame E1. And, the second cell should be positioned behind 53 byte because one cell is 53 byte. The information field eliminating the time slot numbers 0 and 16 from the multi-frame of the frame E1, becomes 3840 bit in total.

Thus, in case that 9 ATM cells are in series mapped, the information field becomes 3816 bit, i.e., 3 byte (24 bit). And, a reserved bit for indicating a start of cell, is mapped on an area from the time slot 1 to the time slot 3. A bit pattern between in the time slots 1 to 3 is given by three consecutive 00110011. On the other hand, after the frame is searched through a frame synchronization signal on the frame E1, the reception terminal is to identify 8 bit of "C0011011" of the frame bit of the time slot number 0, is to check the 3 byte from the time slot 1 to the time slot 3, and then is to sense the start of the first cell of the ATM cells. The bit pattern between in the time slots 1 to 3 is given as three consecutive 00110011. Since the ATM cells are in series mapped on the time slot and each time slot of the frame E1 is 3.9 us, the first time slot 4 is recognized as the first header of the ATM cell. And, once 53 consecutive time slots are extracted, one ATM cell can be extracted.

Through the above method, the 54th time slot is recognized as the first header of the second cell and the ATM cell of 53 byte is extracted. In the same manner, the cell of the 53 byte is consecutively extracted. In this step, the time slot number 1 and the time slot number 16 should be excluded.

Through the above method, if 9 cells are extracted, an operation is completed in one multi-frame. Thereby, in accordance with the above method, it is easy to simply design the overall hardware and the error generation ratio is lowered in the cell extraction step.

Figure 3:
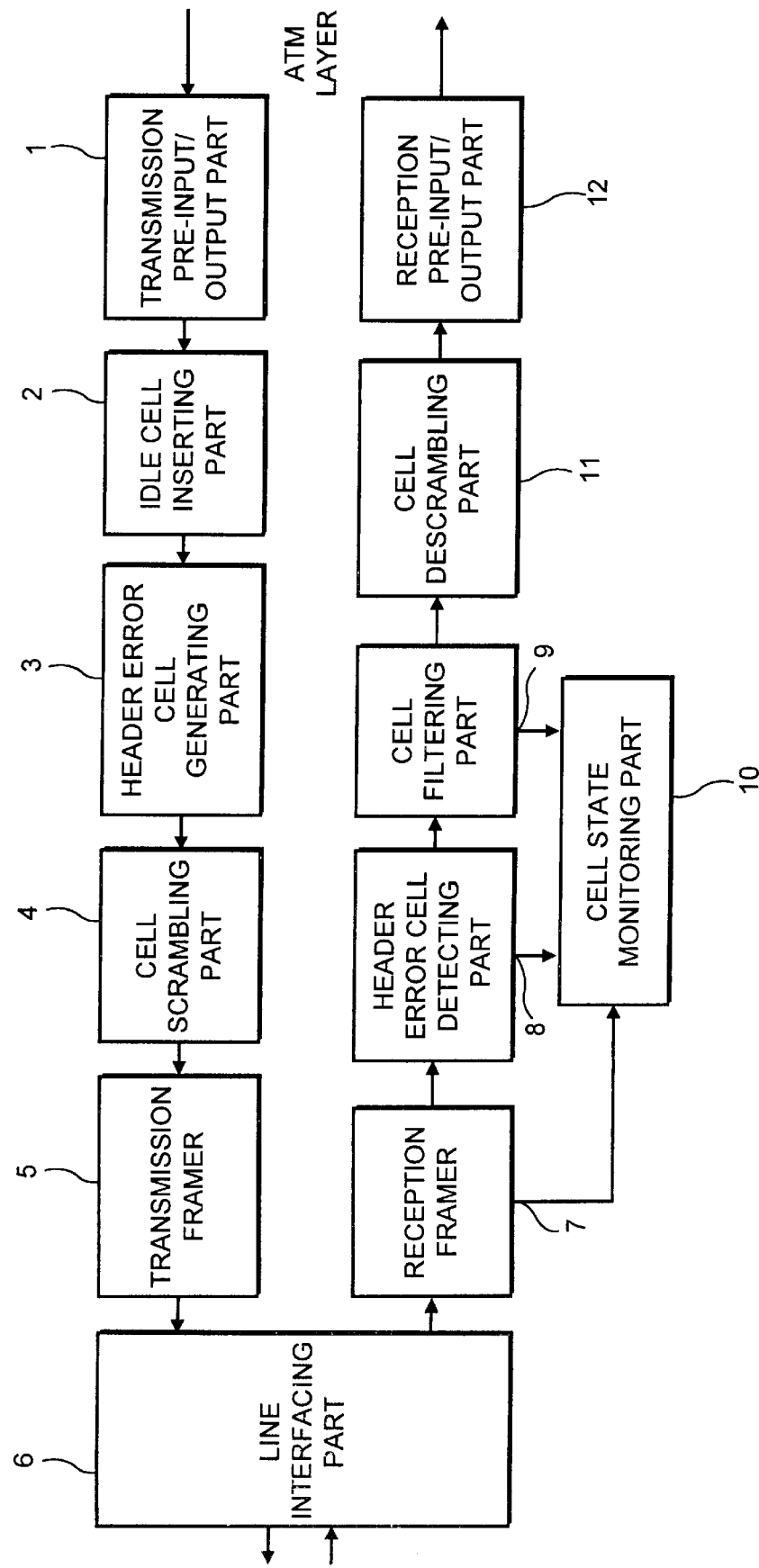
FIG. 3 is a block structure diagram of an ATM cell boundary identification apparatus according to the present invention.

FIG. 3 is a block structure diagram of an ATM cell boundary identification apparatus according to the present invention.

As shown in FIG. 3, a reference number 1 indicates a transmission pre-input/output part for buffering the cell transmitted from the ATM layer, a reference number 2 an idle cell inserting part for inserting the idle cell to be matched with the cell inputted from the transmission pre-input/output part 1, and a reference number 3 a header error cell generating part for generating a header error cell through header information of the cell transmitted from the idle cell inserting part 2.

Also, a reference number 4 indicates a cell scrambling part for scrambling payload of the cell received from the header error cell generating part 3. A reference number 5 indicates a transmission framer for formatting the cell obtained in the cell scrambling part to be suitable to the frame E1. A reference number 6 indicates a line interfacing part for transmitting the transmission frame obtained in the transmission framer 5 to a transmission line by converting it into a bipolar transmission signal, and also for transmitting the frame E1 received from the transmission line to a reception framer 7. A reference number 7 indicates a reception framer for identifying the boundary of the cell according to the time slot of the frame E1 transmitted from the line interfacing part 6 to thereby extract the header error cell. A reference 8 indicates a header error cell detecting part for detecting the header error cell extracted from the reception framer 7, and checking whether the extracted cell is effective or not. A reference number 9 indicates a cell filtering part for filtering the cell obtained from the header error cell detecting part 8. A reference number 10 indicates a cell state monitoring part for monitoring a state of the header error cell and a state of the error cell obtained from the header error cell detecting part 8 and the cell filtering part, respectively. A reference number 11 indicates a cell descrambling part for descrambling the cell from the cell filtering part. And, a reference number 12 indicates a reception pre-input/output part for buffering the cell descrambled in the descrambling part, and transmitting the cell to the ATM layer.

In the preferred embodiment of the present invention, the transmission pre-input/output part 1 is subjected to perform a time buffering function required in mapping an asynchronous cell transmitted from the ATM layer on the transmission line E1. Thereby, the transmission pre-input/output part 1 is provided with data by the byte by separating an operating clock of the ATM layer from that of the physical layer.

That is, the transmission pre-input/output part 1 is provided with data by the byte from the ATM layer, and also it is provided with other data by means of a clock synchronized with the first data by the byte and a control signal. Here, a writing state indicates a writable state only when at least more than one of the ATM cells can afford to be written.

The idle cell inserting part 2 inserts the idle cell into the cell buffered in the transmission pre-input/output part 1 to be matched with the speed of the cell. The header error cell generating part 3 generates the header error cell under use of the first 4 byte of the header of the transmitted cell, and then performs a writing in an area of the fifth header.

In other words, the header error cell generating part 3 generates the CRC for the first 4 byte of the cell header, and inserts it into the fifth byte of the cell header. The header error cell is generated like a following polynomial $X^8+X^2+X+1$.

The cell scrambling part 4 scrambles the cell payload information obtained from the header error cell generating part 3 by using the magnetic synchronous generation polynomial of $X^{43}+1$ by the byte. The cell where payload is scrambled is formatted to be suitable to the frame of E1 in the transmission framer 5.

The line interfacing part 6 converts the formatted frame E1 into the bipolar transmission signal, and transfers the signal to the transmission line.

In the meantime, the frame E1 received from the transmission line is transferred to the reception framer 7 through the line interfacing part 6. The reception framer 7 identifies the boundary of the cell according to the time slot of the transferred frame E1, and extracts the cell.

That is, after the frame is searched through a frame synchronization signal on the frame E1, the reception framer 7 is to identify 8 bit of "C0011011" of the frame bit of the time slot number 0, is to check the 3 byte from the time slot 1 to the time slot 3, and then is to sense the start of the first cell of the ATM cells. The bit pattern between in the time slots 1 to 3 is given as three consecutive 00110011. Since the ATM cells are in series mapped on the time slot and each time slot of the frame E1 is 3.9 us, the first time slot 4 is recognized as the first header of the ATM cell. And, once 53 consecutive time slots are extracted, one ATM cell can be extracted.

And, the header error cell detecting part 8 detects the extracted header error cell, and checks whether the cell is effective or not. The cell through the header error cell detecting part 8 is filtered in the cell filtering part 9 depending upon a cell header pattern, so that more than two error cells are disused. Also, under the error detection mode, the error cell of the cell header is disused. At this time, the effective cells from which the payload is eliminated are filtered, so that only pure service cells can be transferred to the next terminal by eliminating the idle cell inserted to perform a cell match function and a specific pattern of cells discussed with the transmission part. The state of the cell processed in the header error cell detecting part 8 and the cell filtering part 9 respectively, is monitored by the cell state monitoring part 10.

On the other hand, the normal cell without having any error discrambles the magnetic synchronous generation polynomial of $X^{43}+1$ by the byte with respect to the cell payload information. The descrambled cell is transferred to the ATM layer through the time buffering function required in an asynchronous transmission to the ATM layer from the reception pre-input/output part 12. Thereby, the operating clock of the ATM layer is separated from that of the physical layer. The data is sent to the ATM layer by the byte.

Accordingly, as mentioned above, in accordance with the present invention, there are provided efficiencies in that it is easy to extract the ATM cell in the reception terminal by mapping the ATM cell on each time slot of the frame E1, and in that the overall structures of the present invention become simple because it is easy to identify the boundary of the cell.

It will be apparent to those skilled in the art that various modifications and variations can be made in the ATM cell boundary identification apparatus and method of the present invention without departing from the spirit or scope of the invention. Thus, it is intended that the present invention cover the modifications and variations of this invention provided they come within the scope of the appended claims and their equivalents.

What is claimed is:

1. An asynchronous transfer mode cell boundary identification apparatus for transmitting an ATM cell on a frame E1 by mapping, the apparatus comprising:

a cell scrambling unit, a line interfacing unit, a reception framer and a header error cell detecting unit, wherein the reception framer extracts one ATM cell by searching a frame through a frame synchronization signal on said frame E1, identifying "C0011011" of 8 bit which is a frame bit of a time slot number 0, checking 3 byte ranging from a time slot number 1 to a time slot number 3, sensing a start of a first cell of said ATM cells, recognizing a first time slot number 4 as a first header of said ATM cell, and extracting 53 consecutive time slots.

2. An asynchronous transfer mode cell boundary identification method, comprising the steps of:

mapping and transmitting overhead information and an ATM cell on a corresponding time slot of a multi-frame E1; and identifying said ATM cell by identifying information of each time slot of said frame E1, wherein a reception framer extracts one ATM cell by searching a frame through a frame synchronization signal on said frame E1, identifying "0011011" of 8 bit which is a frame bit of a time slot number 0, checking 3 byte ranging from a time slot number 1 to a time slot number 3, sensing a start of a first cell of said ATM cells, and extracting 53 consecutive time slots from a time slot number 4.

* * * * *